Figure 3:
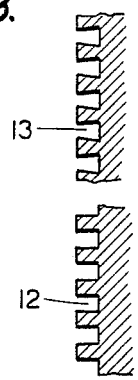

Aug. 27, 1968     V. ADAM     3,398,562
APPARATUS FOR FORMING, HARDENING AND APPLYING LAYERS OF
MALLEABLE MATERIAL UPON PLANAR AND PROFILED SURFACES
Filed Oct. 24, 1963

INVENTOR.
Václav Adam
BY Richard ???

3,398,562
APPARATUS FOR FORMING, HARDENING AND APPLYING LAYERS OF MALLEABLE MATERIAL UPON PLANAR AND PROFILED SURFACES

Václav Adam, Semily, Czechoslovakia, assignor to Vyzkumny a zkusebni letecky ustav, Letnany u Prahy, Czechoslovakia
Filed Oct. 24, 1963, Ser. No. 318,633
Claims priority, application Czechoslovakia, Nov. 9, 1962, 6,330/62
4 Claims. (Cl. 72—215)

The present invention relates to an apparatus for forming, hardening and of applying layers upon planar or profiled surfaces, namely upon surfaces of springs and different guiding surfaces by means of forming bodies where a high strength, smoothness and resistivity to wear is required.

The working of planar and profiled surfaces is at present accomplished mostly by chip working, namely by milling, planing and shaping. In addition experiments have been made with the working of these surfaces by forming by means of different rollers and balls, taken along by supports of planing or shaping machines performing a linear movement. In order to exert the forming effect, high pressures had to be generated by these rollers in a direction perpendicular to the formed surface, however, neither the said machines, nor the tools have been designed for pressures required therefor. Thus it was possible to apply these methods for levelling of small overtoppings only and to harden the surface to a small depth of several tenths of a millimeter only.

The generation of surfaces capable to resist corrosion, wear, temperatures and similar, is accomplished at present mainly by applying the resistive material in the form of thin layers in the molten state or galvanically. It is at present impossible to form thicker resistive layers at large surfaces even by the above mentioned forming methods.

The method of forming, hardening and of applying of layers upon planar and profiled surfaces according to this invention enables to level even overtoppings after coarse prior wroking, after casting and rolling, to harden these surfaces to the depth of several millimeters and namely to apply layers of malleable material resistive to corrosion, wear and high temperatures. This method is performed by means of a device according to this invention, using preferably currently used machines performing a linear movement as for instance planing, shaping and similar machines.

A substantial feature of the method of forming, hardening and applying of layers upon planar and profiled surfaces by means of forming bodies, rolling along projections and depressions of a cam is in that the forming bodies are after approaching the surface of the workpiece rolled in a straight direction. In case this rolling is accomplished in the forward and rearward direction, the lateral shifting takes place at the turning point. In case of applying layers, the surface of the workpiece is provided with grooves having for instance a dove-tail profile whereafter either a smooth malleable foil is placed upon the workpiece or one provided with grooves corresponding to the grooves of the workpiece.

A substantial feature of the device for performing these methods, which is provided with a body adapted for non-rotatable fixing and with a cam having projections and depressions, is that the cam forms a guiding for an endless chain with chain elements and with inserts, provided with taking-along means. This chain represents a cage for the inserted forming bodies, which can be arranged in two or more rows. These rows of forming bodies can be relatively staggered for a height, the magnitude of which is given by the shape and overtopping of the projections of the processed surface of the workpiece.

The accompanying drawing shows an example of an embodiment of a device for the application of the method according to this invention.

Figure 2:
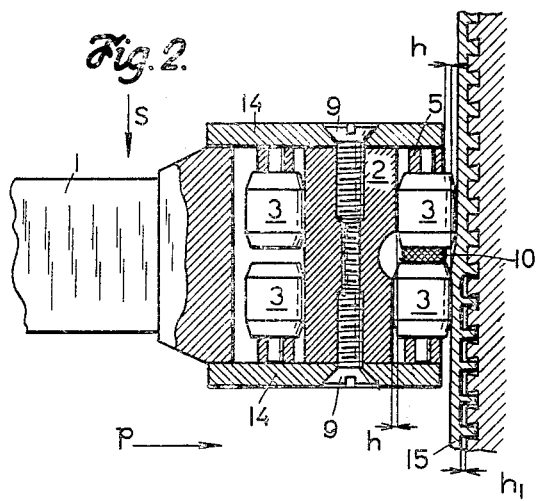
Figure 1:
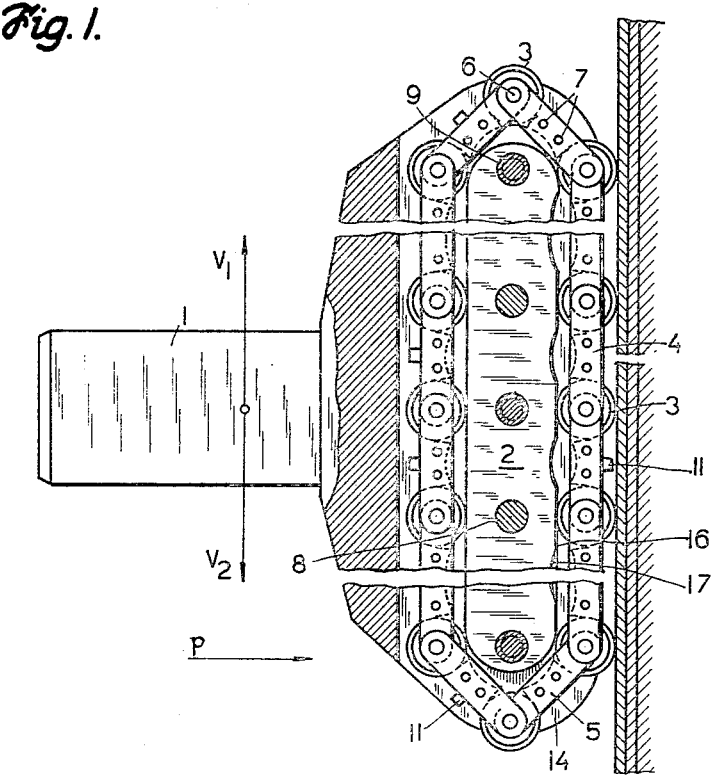

FIG. 1 is a view upon the device and upon the processed semiproduct in a cross section along the plane of the longitudinal cross section A—A, FIG. 2 is a view of the device in a cross section along the plane of the lateral cross section B—B and FIG. 3 shows profiles of the semiproduct, prepared for the application of a layer of malleable material. The arrows $p$ show the direction of movement into engagement and the direction of application of the pressure upon the device in course of processing the surface of the semiproduct.

The arrow $s$ shows the direction of movement of the device along the processed surface and the arrows $v_1$ and $v_2$ show the forward and return working stroke.

The device for forming, hardening and for applying of layers upon planar and profiled surfaces according to this invention comprises a body 1 adapted for non-rotatable fixing. This body 1 has two lateral walls 14, between which a cam 2 is arranged, fixed by means of screws 9 and bolts 8. The cam 2 is provided at its working surface with projections 16 and depressions 17. An endless chain composed of elements 5 linked by bolts 6 surrounds the cam 2. Inserts 4 provided with take-along means 11 form together with the elements 5 a moving cage for the inserted forming bodies 3, said inserts fixed by rivets 7 between the opposite chain elements 5. The forming bodies 3 can be arranged in two or more rows. In that case guiding inserts 10 can be inserted between the rows of the individual forming bodies 3. The individual rows can be furthermore relatively staggered for the height $h$, the magnitude of which depends upon the shape and overtopping of the projections of the processed surface.

In case the presented body is of cylindrical shape, the endless chain with the forming bodies 3 can surround this body. The shape of the cam 2 has to be of course adjusted to the processed surface.

The forming and simultaneous hardening of planar and profiled surfaces by means of this device is accomplished by first approaching this device in the direction $p$ perpendicular to the coarse surface of the semi-product and by moving it alternately in the direction $v_1$ and $v_2$ parallel with the processed surface at a simultaneous shifting perpendicular to that direction in the direction $s$ at the turning points of the movements in the direction $v_1$ and $v_2$. In the course of the movements in the directions $v_1$ and $v_2$ the forming bodies 3 are alternately rolling along the projections 16 and depressions 17 of the cam 2, whereby they perform a forging and forming movement. The take-along means 11 help by contact with the workpiece to move the chain and thus also the forming bodies 3 in case these bodies 3 would by chance remain in the depressions 17 of the cam 2.

The application of layers of malleable foils upon planar and profiled surfaces by means of the device according to this invention is accomplished so that first grooves 12 advantageously of dove-tail shape 13 are formed on the surface of the workpiece either by working or by forming. Similar grooves 12 can be made on the malleable foil 15. By applying the foil 15 upon the thus prepared surface of the workpiece and by the action of the device according to this invention both parts are perfectly bonded.

In case the faces of the projections 16 of the cam 2 are situated along a concave surface, it is possible to work by means of this device convex surfaces and vice versa.

In case only small pressures are required for forming, the cam 2 can be replaced by a body with a planar working surface, i.e. without projections 16 and depressions 17.

The coarse surface of the semiproduct can be prior to processing by this method suitably prepared and different slippery or non-corrosive material applied to the surface.

The method of forming, hardening and applying of layers according to this invention is suitable for a wide range of use. It is namely suitable for working and for applying of surface layers ot guiding surfaces of sliding elements, of rams, of supports, of connecting links, guiding posts, non-corrosive and heat resistant vessels, kneading jaws, grids, formblocks and similar.

I claim:
1. A device for forming, hardening and applying of layers upon planar and profiled surfaces comprising a body adapted to be fixed in a non-rotatable manner upon a part of a machine capable to perform a return movement, a cam fixed on said body, said cam provided with projections and depressions facing the surface to be processed, an endless chain adapted to be moved along said cam, a number of rolling bodies, said endless chain provided with inserts and take-along means forming a cage taking along said rolling bodies.

2. A device for forming, hardening and applying of layers upon planar and profiled surfaces comprising a body adapted to be fixed in a non-rotatable manner upon a part of a machine capable to perform a return movement, a cam fixed on said body, said cam provided with projections and depressions facing the surface to be processed, an endles chain adapted to be moved along said cam, a number of rolling bodies, said endless chain provided with inserts and take-along means forming a cage taking along said rolling bodies, said rolling bodies arranged in parallel rows.

3. A device for forming, hardening and applying of layers upon planar and profiled surfaces comprising a body adapted to be fixed in a non-rotatable manner upon a part of a machine capable to perform a return movement, a cam fixed on said body, said cam provided with projections and depressions facing the surface to be processed, an endless chain adapted to be moved along said cam, a number of rolling bodies, said endless chain provided with inserts and take-along means forming a cage taking along said rolling bodies, said rolling bodies arranged in parallel rows, with guiding inserts provided between adjacent rows.

4. A device as in claim 3 wherein said parellel rows of rolling bodies are staggered for a height determined by the overtopping of the projections of the processed surface of the workpiece.

References Cited
UNITED STATES PATENTS

| | | | |
|---|---|---|---|
| 628,564 | 7/1899 | Traxler | 72—215 |
| 925,028 | 6/1909 | Richards | 72—214 X |
| 2,050,993 | 8/1936 | Bush | 29—521 |
| 2,343,126 | 2/1944 | Matlat | 72—214 X |
| 3,166,008 | 1/1965 | Lewandoski | 72—214 X |
| 3,199,327 | 8/1965 | Krause | 72—215 |

CHARLIE T. MOON, *Primary Examiner.*